United States Patent [19]

Goldsmith

[11] 4,323,351
[45] Apr. 6, 1982

[54] VISUAL DISPLAY APPARATUS FOR THE DISPLAY OF THE AUTONOMIC NERVOUS SYSTEM AND MUSCULATURE AND SPINAL NERVES AND RELATED METHOD

[75] Inventor: Bruce W. Goldsmith, Kerhonkson, N.Y.

[73] Assignee: Space Odyssey Ltd., Kerhonkson, N.Y.

[21] Appl. No.: 106,543

[22] Filed: Dec. 26, 1979

[51] Int. Cl.³ ............................................. G09B 23/30
[52] U.S. Cl. .................................. 434/274; 434/272; 40/442
[58] Field of Search ............... 434/153, 267, 268, 270, 434/272, 274, 430, 428, 282; 40/442, 463; 340/286 M

[56] References Cited

U.S. PATENT DOCUMENTS

| | | | |
|---|---|---|---|
| 1,427,678 | 8/1922 | Cummings | 340/286 M |
| 1,581,736 | 4/1926 | Hassler | 434/274 |
| 1,641,914 | 9/1927 | Boillot | 40/442 X |
| 1,727,840 | 9/1929 | Pardee | 340/286 M |
| 1,949,519 | 3/1934 | Wagenhals | 40/442 |
| 2,159,925 | 5/1939 | Wood | 340/286 M |
| 2,173,400 | 9/1939 | Shaw | 340/286 M X |
| 2,537,573 | 1/1951 | Conschafter | 434/274 |
| 3,274,717 | 9/1966 | Herr | 40/463 |
| 3,688,008 | 8/1972 | Krieger | 40/442 |
| 3,731,400 | 5/1973 | Pile et al. | 434/272 |

Primary Examiner—Harland S. Skogquist
Attorney, Agent, or Firm—Posnack, Roberts, Cohen & Spiecens

[57] ABSTRACT

A display apparatus is provided which is divided into two frames. On one frame is pictured a human body with the spinal column thereof formed of a plurality of vertebrae. The human body displayed also includes a plurality of organs and the like which are associated, according to *Gray's Anatomy*, with the various vertebrae. Push-button controls are positionally related to the vertebrae and when operated could cause an illumination of the related organs. A further series of push-button controls are provided in order that the organs can be separately illuminated as desired. Arrangement is made so that the illumination can be steady state or pulsating fashion selectively. On the second of the aforesaid frames is visually displayed a set of front and rear views of the human body and the related musculature. Push button controls are arranged for the illumination of the various muscles. These latter push-button controls are coupled to one of the aforesaid sets of controls for interaction therewith. Also visually displayed on the second frame are the spinal nerves in association with the cranial nerves of the human body, there being controls provided for the illumination in selective manner of the displayed spinal nerves.

15 Claims, 10 Drawing Figures

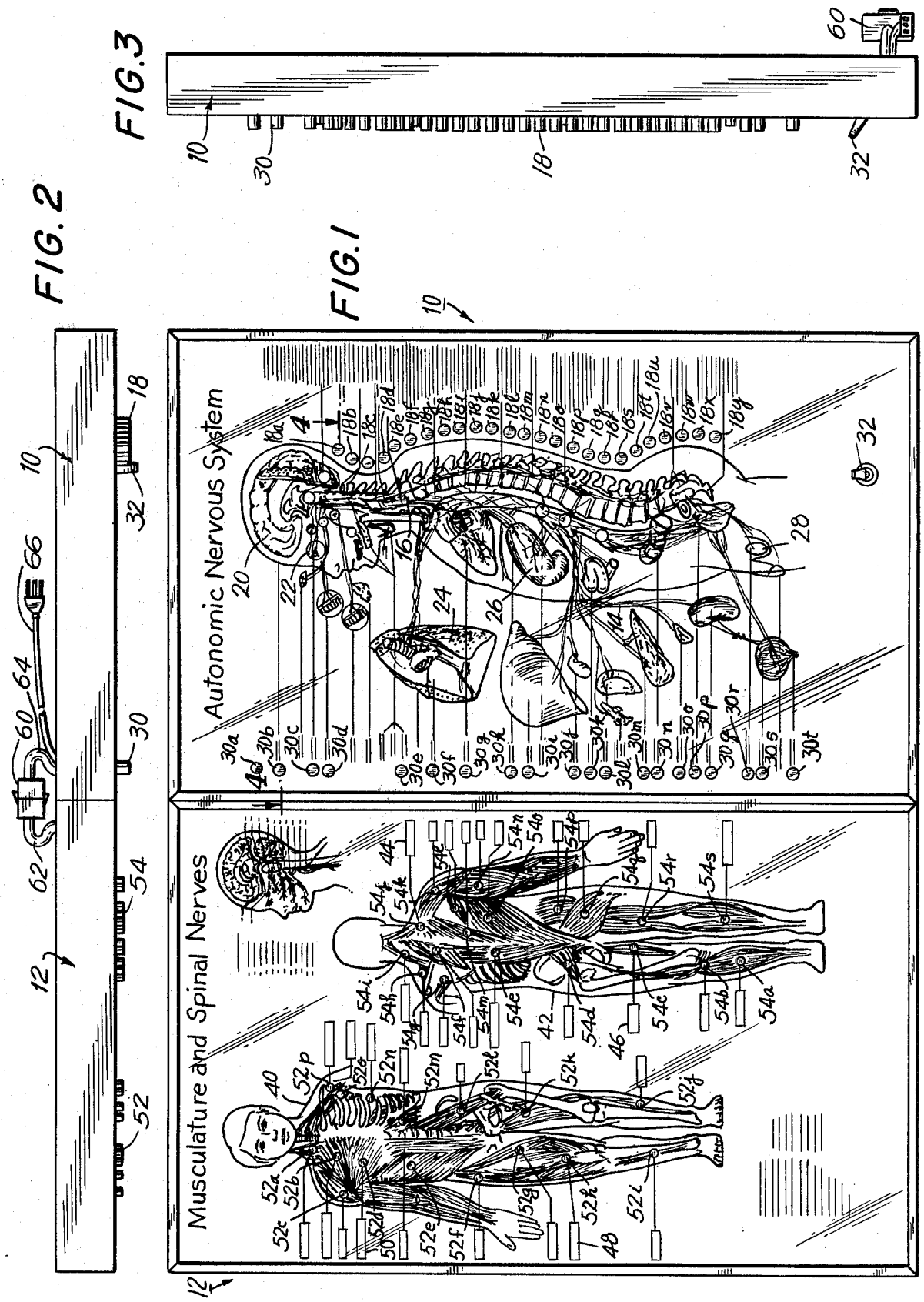

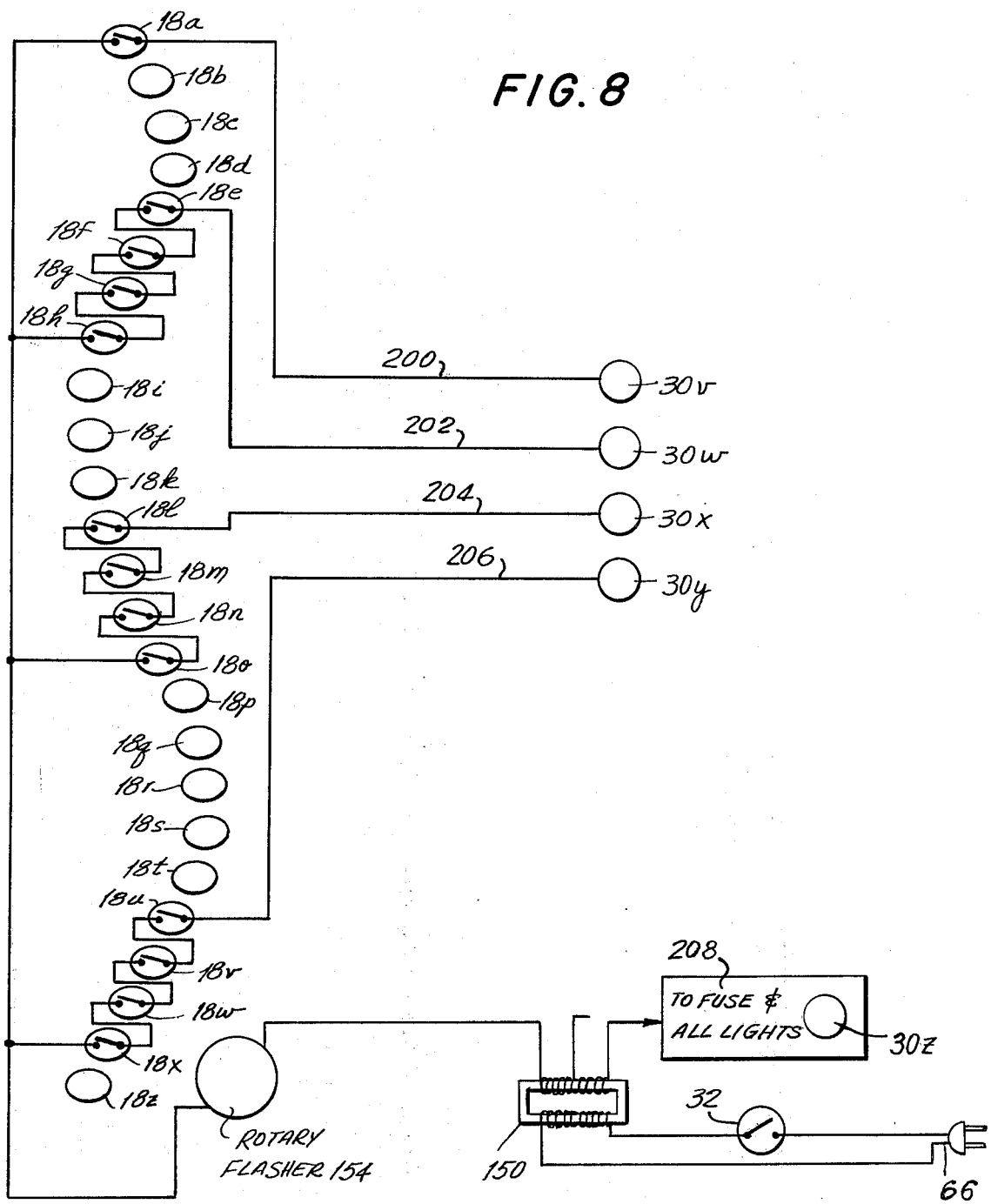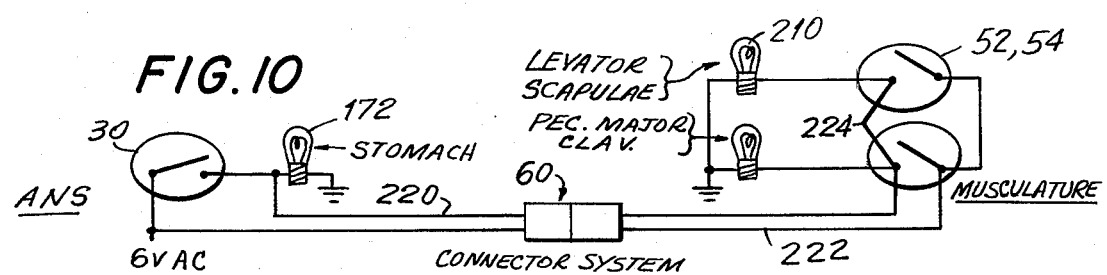

VISUAL DISPLAY APPARATUS FOR THE DISPLAY OF THE AUTONOMIC NERVOUS SYSTEM AND MUSCULATURE AND SPINAL NERVES AND RELATED METHOD

FIELD OF INVENTION

This invention relates generally to visual displays and more particularly, to visual displays suitable for conveying information with respect to the human body. The invention also relates to methods associated with the above-mentioned display apparatus and, more particularly, to methods for displaying the relationship between the vertebrae of the spine of a body and related organs, musculature and spinal nerves.

BACKGROUND

Visual display devices are teaching devices used to communicate information. These devices generally include motion pictures, slides, charts and television.

Visual displays provide highly effective teaching methods for the conveyance of information. They make possible a wide range of interesting, realistic, meaningful and stimulating learning experiences. It is believed that the effective use of visual displays improves learning processes because the material displayed can be directly viewed, rather than being disclosed through the intermediary of written or oral description. It is believed further that visual displays make learning more permanent, because the viewer can visualize in his or her mind precisely what they have seen.

It is thought that appropriately selected and professionally used visual displays help at all levels of education in the communication of information and ideas, as well as in the development of attitudes and understanding and in the teaching of professional skills.

Educational aids may be, for example, pictorial, graphic, three dimensional and audio. Amongst the pictorial aids are photographs, slides, film strips, prints and stereographs. None of these aids have been directed to the conveyance of information as is permitted by the present invention and as will be described in greater detail hereinafter.

SUMMARY OF INVENTION

It is an object of the invention to provide improved visual displays and related methods for the conveyance of information by use of improved visual aids.

It is a more specific object of the invention to provide improved methods for conveying the principles of human nervous system physiology.

It is a further object of the invention to provide improved systems and techniques which will clarify the anatomical relationships that are synonymous with the chiropractic approach to health care.

Yet another object of the invention is to provide improved visual displays that will simplify patient education and reduce orientation time.

Still further objects of the invention relate to the improvement of patient comprehension by the provision of electrified charts which are clearly and easily read, thereby eliminating confusing and difficult terminology.

Still another object of the invention is to provide for the pairing of the autonomic nervous system and musculature units, while also depicting nerve pathways to the extremities and muscle groups.

Another object of the invention relates to providing the foregoing advantages in sophisticated slim-line cabinets to provide a package of visual aids that will graphically reinforce a patient's education.

To achieve the above and other objects of the invention, there is generally provided, as will be explained in greater detail hereinafter, a display apparatus comprising display means for displaying a human spine including a plurality of vertebrae and for displaying a plurality of human organs physiologically associated with said vertebrae, there being furthermore provided illumination means for illuminating said organs, and control means positionally corresponding to respective of said vertebrae and adapted for being individually operated to modify the illumination of respective of said organs.

Supplemental to the above, the aforesaid control means may include switches respectively positioned adjacent said vertebrae and electric circuitry coupling said switches to said illumination means to modify the illumination of the corresponding organs. Moreover, there may be provided supplemental control means coupled to said illumination means for illuminating selective of said organs. This latter operation may take place independently of the first said operation indicated hereinabove.

The illumination means referred to hereinabove may include a first plurality of lamps coupled via said electric circuitry to said switches and a second plurality of lamps coupled to said supplemental control means.

In addition and as a further feature of the invention, there may be provided supplemental display means for displaying musculature inclusive of a plurality of physiologically related muscles, musculature lamps for illuminating respective of said muscles, said muscles being physiologically related to said organs, musculature switches for selectively operating said musculature lamps, and electric circuit means coupling said musculature switches and musculature lamps to said supplemental control means, such that operation of the supplemental control means illuminates said organs and muscles selectively and operation of the musculature switches illuminates said organs and operates said musculature lamps selectively.

In addition and as still a further feature of the invention, the supplemental display means may display spinal nerves and will include further lamps for the purpose of illuminating the spinal nerves, and controls for operating said further lamps.

In accordance with the physical structure of the display means of the invention, there may be provided separate frames respectively supporting the first said display means and the aforesaid supplemental display means and respectively supporting said supplemental control means and musculature switches. Coupling means will be provided for connecting the supplemental control means and the musculature switches.

In accordance with another aspect of the invention, flasher means may be coupled to and operated by said control means to modify the illumination of the aforesaid organs by causing the illumination means to pulsate.

The above-noted frames may, for example, be of substantially equal size and are generally and preferably rectangular in shape. The frames are arranged in edgewise abutting relationship.

In further accordance with the invention, the first said display means includes a layer of transparent material, having a print of a human body on the back side thereof, including a print of said spine and organs, and said supplemental display means will also include a layer of transparent material, having at least one print of a human body thereon, inclusive of said musculature.

Relative to other features of the invention, there will be provided layers of light impermeable material on the layers of translucent material between the latter and said illumination means and said musculature lamps respectively, said layers of light impermeable material being provided with openings for the illumination of said organs and muscles. In this arrangement, there may be particularly provided brackets for supporting pairs of said lamps, from said first and second pluralities of lamps, adjacent said organs, and clips mounting said lamps detachably on said brackets. The aforesaid flasher means may consist of a rotating cam and a switch periodically operated by said cam.

In a particular arrangement of the circuitry of the invention, at least one lamp of said second plurality of lamps is coupled to at least one musculature switch, in addition to being coupled to said supplemental control means. Furthermore, the musculature lamp associated with the said at least one musculature switch is additionally coupled to and operated by said supplemental control means.

In further accordance with the invention, there is provided a method. Said method will comprise visually displaying a human body inclusive of a spinal column consisting of vertebrae and associated organs and the method will moreover comprise selectively illuminating said organs by switches respectively positioned adjacent the vertebrae in correspondence thereto.

According to another aspect of the invention is implied hereinabove, the method comprises illuminating said organs independently of said switches with other controls positioned in correspondence to said organs.

A further feature of the method of the invention involves selectively illuminating the organs in steady state or in pulsating mode.

The method of the invention further comprises visually displaying a human body inclusive of musculature composed of muscles and selectively illuminating the muscles by controls arranged in positional correspondence therewith. The intercoupling of the controls for the organs with the controls for the muscles is also a feature of the method of the invention.

Still a further feature of the method of the invention comprises visually displaying spinal nerves and illuminating the same by controls positionally arranged in correspondence therewith.

Other objects, features and advantages of the apparatus and method of the invention will be found in the detailed description which follows hereinafter, as illustrated in the accompanying drawing.

BRIEF DESCRIPTION OF DRAWING

In the drawing:

FIG. 1 is a front view of a visual display apparatus provided in accordance with the invention and consisting of two frames;

FIG. 2 is a top view of the apparatus illustrated in FIG. 1;

FIG. 3 is a side view of the apparatus illustrated in FIG. 1;

FIG. 8 is a schematic diagram, complimentary to that of FIG. 7 and illustrating further controls employed in association with the power supply and flasher unit of FIG. 7;

FIG. 10 illustrates a circuit feature employed in the foregoing circuits.

DETAILED DESCRIPTION

Figure 4:
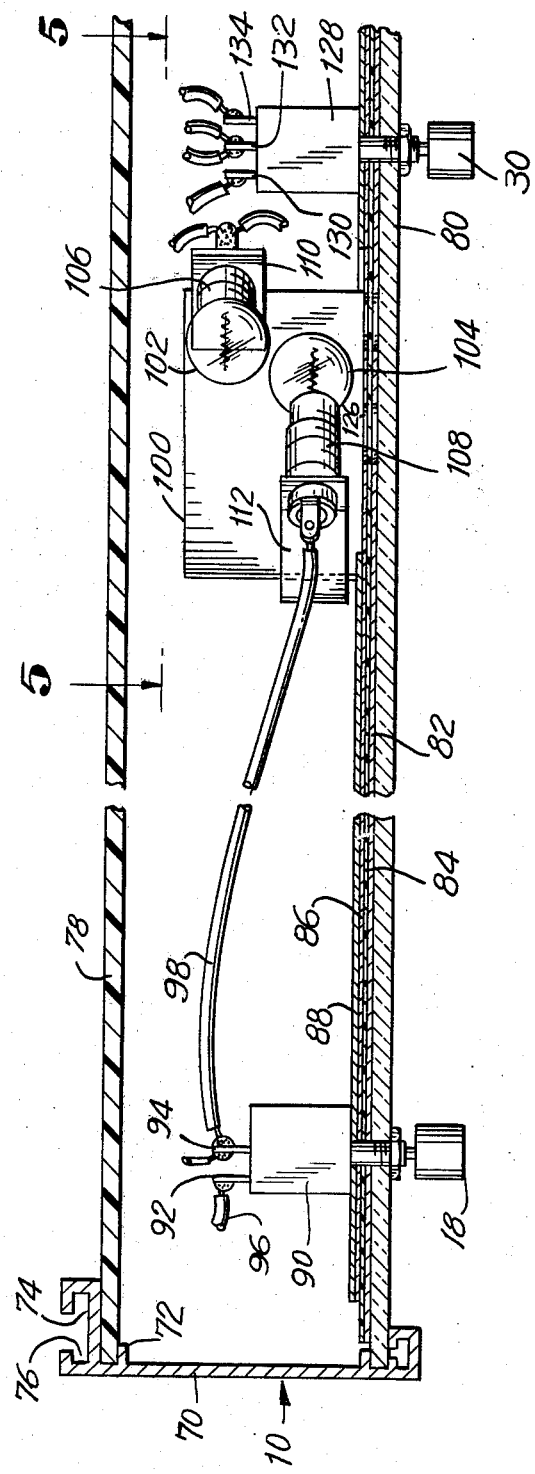
FIG. 4 is a cross-sectional view taken along line 4—4 of FIG. 1.

The invention provides a visual display system wherein at the push of a button the principles of chiropractic and applied kinesiology are revealed. The display apparatus of the invention clarifies the anatomical relationships that are synonymous with chiropractic approaches to health care. The system of the invention provides a dramatic visual impact, which simplifies patient education and reduces orientation time. With the use of the apparatus of the invention, one can be assured of patient comprehension, due to the use of up-dated electrified charts, which are clearly and easily read, thereby eliminating confusing and difficult terminology.

The invention fulfills the demand for truly accurate, but functional visual aids, and, in accordance with the invention, there can be employed sharply and vividly silk screened charts on the reverse side of clear acrylic to provide a startling display which makes a very good impression on the mind of the viewer.

As will be seen hereinafter, the electronic circuitry of the invention provides a realistic flashing display of anatomical relationships and novelty pairs autonomic nervous system and musculature units to create the visualization of the myo-visceral correlations as indicative of applied kinesiology. Added to this is a depiction of spinal nerves, depicting the nerve pathways to the extremities and muscle groups. These are all incorporated into a sophisticated slim line cabinet arrangement to provide a package of visual aids that graphically reinforces the patient's education.

It is clarified precisely how the body communicates through a perfectly functioning cerebro-spinal system and the relationship is demonstrated by allowing a patient to operate controls corresponding to positions relating to the spine of the human body. Once the patient is oriented to the relationship between his spinal problem and his symptomatic complaint, be becomes aware that the curing of the cause and allowing the body freedom to heal itself is a rational approach to good health.

In the following description the autonomic nervous system may, for example, be illustrated, as it is in one constructed system, for a ten-color chart. The musculature system may, for example, be illustrated by a three-color chart. The spinal nerves may be illustrated, for example, by a four-color chart.

Although not discussed in detail hereinafter, modern technology provides for the use of most sophisticated circuitry and the illustrated circuits may, for example, be provided in the form of printed circuit boards, with heavy duty transformers being employed to exacting specifications. A dependable quality connector systems permits the coupling of the autonomic nervous system to the muscular unit by means of a simple one-step operation. A motorized flasher module is employed which clearly illustrates both mal-function and pain. The size of the units described below is, for example, inclusive of a thirty-inch height by an eighteen-inch width by a two-and-a-half-inch depth. The units weigh approximately twenty pounds each and can be mounted to hang like a wall picture. Nylon glides may be provided on the back to prevent the scarring of wall surfaces.

With respect to the autonomic nervous system to be described hereinafter, a vivid demonstration of the vital link between spinal misalignments and the viscera may be effected by pressing a spinal switch such that the dysfunctioning organs flash. The musculature system visual aid works in conjunction with the autonomic nerve system. The pressing of organ or muscle switches to be described hereinafter illuminates the appropriate applied kinesiology response. As to the spinal nerves, a visualizer depicting nerve pathways to the extremities and muscle groups is afforded with a flashing illumination indicating pain or malfunction.

FIG. 1 illustrates a visual display apparatus provided in accordance with the invention. It consists of two frames indicated generally at 10 and at 12. The frame 10 bears a visual illustration of the autonomic nervous system. It portrays a human body generally indicated at 14 and inclusive of a spinal column indicated at 16 and consisting of a plurality of vertebrae appropriately positioned to afford skeletal support to the human body.

In association and positionally related to the various vertebrae of the spinal column are a plurality of push-button switches indicated generally at 18a–18y. As will be explained hereinafter, the uppermost and lower most of these switches namely, 18a and 18y, are in correspondence with specific vertebrae (atlas and coccyx).

Also illustrated in the autonomic nervous system portion of the display aid are a plurality of organs. These organs will not be all specifically identified herein, but there are included by way of example a brain 20, an eye 22, lungs 24, kidney 26 and sex gland 28. Operatively associated with all of the organs are a plurality of push-button switches designated at 30a–30s,t. Also, indicated on frame 10 is a switch 32, the purpose of which will be indicated in greater detail hereinafter.

Upon operation of the switch 32, the organs may all be illuminated by means of illuminating lamps, as will be described in detail hereinafter. This illumination may, for example, be effected in steady state. Under such circumstances, operation of one of the push-buttons 18 may cause a corresponding organ to be illuminated in pulsating mode, thereby indicating the relationship between a specific one of the vertebrae in the spinal column and a specific organ, which is associated therewith. This will inform the patient that relief applied to the specific vertebrae indicated will have an effect on the treatment of the illustrated organ.

On the other hand, it may be desired to illuminate the specific organ without reference to the vertebrae involved. This type of illumination is effected by means of one of the push-buttons 30a–s,t. Thus, for example, if it is desired to illuminate the brain 20, this may be effected by operation of the push-button switch 30b.

The illustrations on the frame 12 relate to the illustrations on the frame 10 and there is an electrical connection therebetween to provide corresponding illuminations as will be shown in detail hereinafter.

On the frame 12 are visually and pictorially shown front views and rear views of a human body as indicated at 40 and 42. In these views is indicated the musculature consisting of a plurality of muscles, such as, for example, tabulated by legends shown, for example, at 44, 46, 48 and 50. The front view 40 has positionally located relative to the various muscles a multitude of push button switches or controls indicated at 52a–52p.

The rear view 42 has a plurality of push button switches or controls positionally corresponding to the muscles therein and indicated at 54a–54s. Operation of the switches 52 or 54 will cause an illumination of the corresponding muscle and, as will be shown hereinafter, the push buttons 52 and 54 are intercoupled with the push buttons 30 in such a manner as to cause an interrelationship of the illumination effected thereby. Accordingly, as will be shown, operation of push button 30c, for example, will cause an illumination of the corresponding organ or part on frame 10, as well as illumination of a corresponding muscle on frame 12.

In the aforesaid discussion, it will be noted first of all that the reference to "organs" is a general reference which is intended to cover not only organs, but other parts of the human body which are not necessarily strictly classified as organs such as spine, glands, and the like. It will also be appreciated that the visual display apparatus of the invention is applicable not only to autonomic nervous systems and musculature and spinal nerve systems, but to the relationship of other parts as well. Thus, for example, the visual display apparatus of the invention may, for example, be applied to the mechanical parts of automobiles and aircrafts and certainly may apply equally well in connection with animal systems for the instruction of veterinary students or biology students and the like. As a matter of fact, the invention is applicable to a wide variety of system analyses which are virtually without number.

FIG. 2 illustrates a top view of the system discussed above. Therein it will be seen that the frames 10 and 12 are maintained in edgewise abutting relationship. These two rectangularly shaped frames are provided in separate form to allow the use of one frame without the other under certain circumstances and to allow the same to be packaged and shipped in more convenient form.

However, to afford an electrical connection between the two, there may be provided a coupling system generally indicated at 60 and inclusive of cables 62 and 64, each incorporating a plurality of wires corresponding to the numbers of push buttons which have been illustrated.

FIG. 2 furthermore illustrates the power input line 66 and affords a view as well as the push buttons 18, 30, 52 and 54. The switch 32 is again indicated on the front.

FIG. 3 illustrates a side view of the visual display system of FIG. 1, there being afforded a view of the side of frame 10 along with a view generally of the push buttons of which it will be assumed that only push buttons 18 and 30 are seen. Switch 32 is also indicated along with the coupling device 60 which will be discussed in greater detail hereinafter.

FIG. 4 as mentioned hereinabove is a cross-sectional view taken along line 4—4 in FIG. 1. Therein is visualized the frame 10, the details of which may be generally considered as applying as well to frame 12. More particularly the frame 10 consists of a side 70, including a receptacle formed of wall 72 and 74, there being a slide 76 provided as a spacer relative to the wall upon which the frame is mounted and in which may be mounted a nylon glide (not shown) to prevent a marring of the wall against which the frame is mounted.

A back member 78 of generally planar form and made of plywood or the like is mounted in the pair of receptacles defined by walls 72 and 74 (one of the receptacles not being illustrated in FIG. 4). The end wall 70 may be fabricated of plastic, metal or the like or any suitable material having adequate strength to support the weight of the unit.

The front of the frame consists of an outer pane of glass or plastic 80 which shields the illustration provided on the frame 10. The illustration is effected in the form of a print layer 82 which may be silk screened onto the back of a transparent or translucent frosted layer 84 formed of plastic or the like. The deposit of the print layer 82 on the supporting layer 84 may be effected by other conventional means beside the silk screening which has been mentioned. The silk screening or painting are, however, the preferable manners of depositing illustrations on the frosted or painted layer 84.

Behind the frosted layer is a layer of black paper or paint 86 or other similar light impermeable material adapted to localize the background of the device where illumination is intended to be imparted to the aforesaid organs and vertebrae. Behind the layer 86 is a layer of sheet metal 88 affording adequate strength to the lamination to support other units which are to be described in greater detail hereinafter. Thus, there is a strength affording layer, a light impermeable layer, a translucent or painted layer and a print layer, all protected by an outer pane of glass or plastic as has been described hereinabove.

One of the push buttons 18 is illustrated in FIG. 4. It is associated with a switch of conventional construction generally indicated at 90. On the back of the switch appears two terminals 92 and 94 to which electrical connection is made by way of wire 96 and wire 98. The particular incorporation of these wires in a circuit will be described hereinafter.

Mounted on the sheet metal 88 is a support bracket 100 fabricated, for example, of metal or plastic or the like. The bracket 100 should be of sufficient strength to support the weight of light bulbs and supporting members and should also be of a character as to resist the heat generated by such light bulbs. It also shields light from certain areas.

Figure 5:
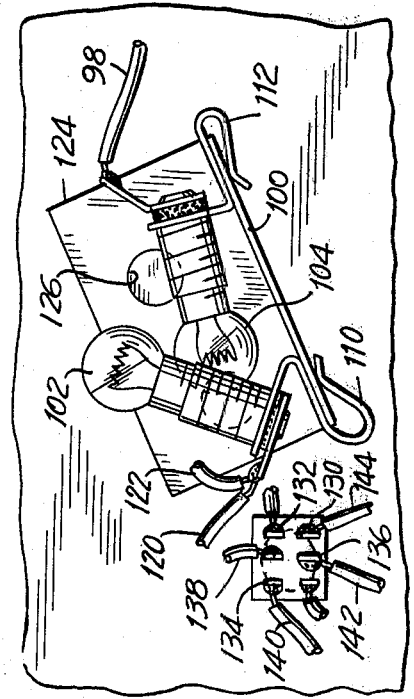
FIG. 5 is a fragmentary view taken along line 5—5 of FIG. 4.

Two bulbs are mounted on bracket 100 and are indicated at 102 and 104. The bases of these light bulbs indicated at 106 and 108 are mounted in clips 110 and 112. These clips are also illustrated in FIG. 5, wherein it can be seen that clips 110 and 112 are hairpin type clips which detachably mount the bulbs 102 and 104 on the associated bracket 100. Electrical connections are made with the bulbs by means of wire 98 discussed hereinabove and further wires 120 and 122. The arrangement of all of these wires will become apparent hereinafter in a detailed description of the circuitry of the invention.

It will be noted that the base of the bracket indicated at 124 is provided with an opening or hole 126, the purpose of which is to admit a confined beam of illumination to pass through to illuminate a corresponding organ or the like on the front of the corresponding frame.

A flasher button 30 is illustrated in FIG. 4 in association with a switch 128 of conventional construction. Terminals 130, 132 and 134 appear in FIG. 4, whereas terminals 130, 132 and 134 also appear in FIG. 5 accompanied by a further terminal 136. Wires 138, 140, 142 and 144 appear in FIG. 5 for purposes of making electrical connection to the push button 30 for reasons and in an arrangement which will become more apparent hereinafter.

Figure 6:
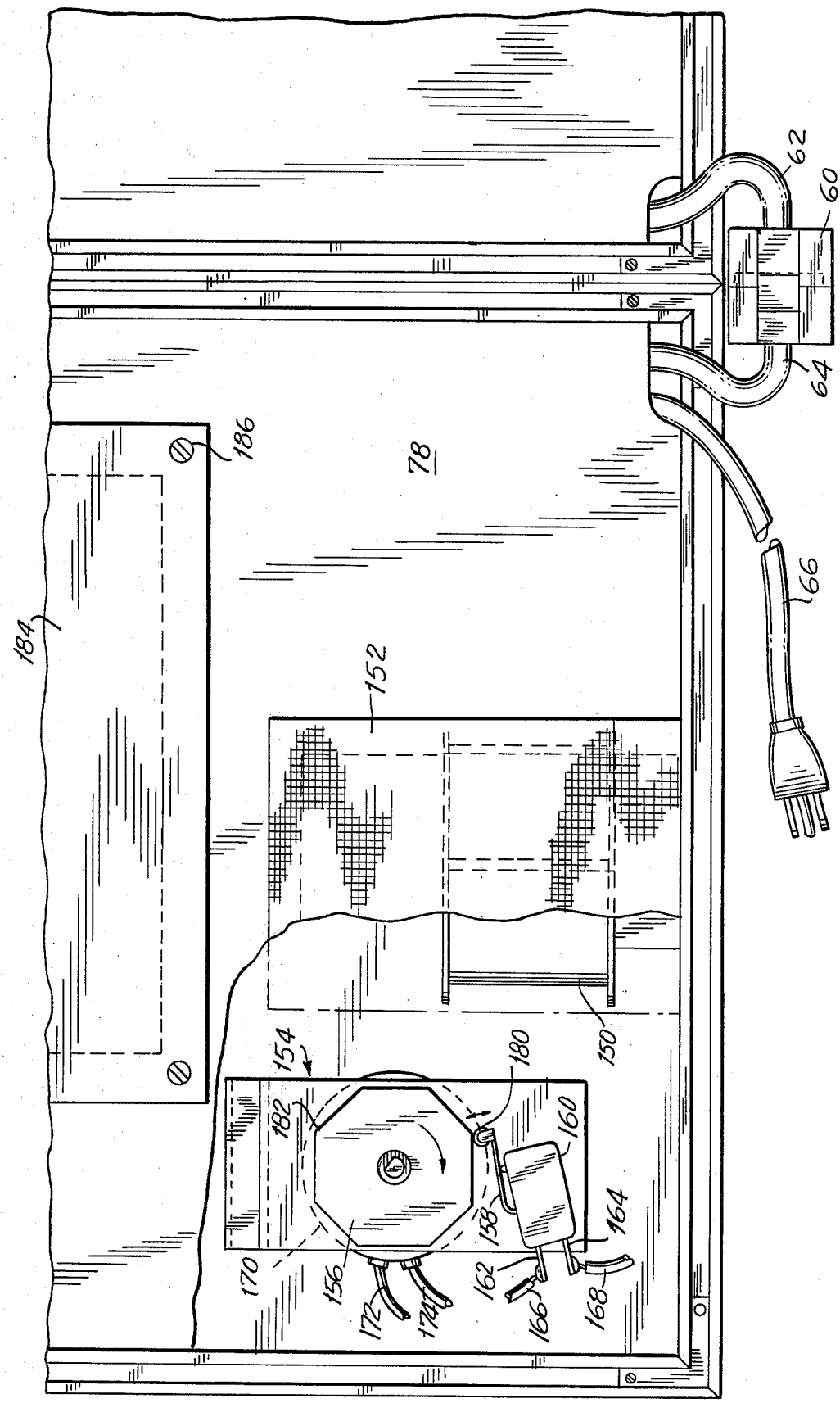
FIG. 6 is a fragmentary view illustrating the flasher unit and power supply of the apparatus of FIG. 1.

FIG. 6 illustrates some further features of the invention, including the power transformer 150, adjacent which is mounted a mesh 152 to permit a dissipation of heat generated therein. A flasher unit is indicated at 154 and includes a rotating cam 156 operating lever 158 of a switch 160, having terminals 162 and 164, to which connections are made by wires 166 and 168 respectively. It will be clear from what has been described that rotation of cam 146 driven by motor 170 through power supplied through wires 172 and 174 will cause an operation of lever 158 when roller 180 thereon is encountered by protrusions 182 on cam 156. The switch 160 will therefore be operated periodically to cause a pulsating mode of operation of the related lamps as will become more apparent hereinafter.

Also indicated in FIG. 6 is an access panel 184 mounted by a plurality of screws 186 in back panel 78 to afford access to the interior of the frame for purposes of maintenance and replacement of parts such as, for example, to permit a change of bulbs or the like.

Further illustrated in FIG. 6 is the coupling 60 referred to hereinabove accompanied by cables 62 and 64 and by power supply line 66.

Figure 7:
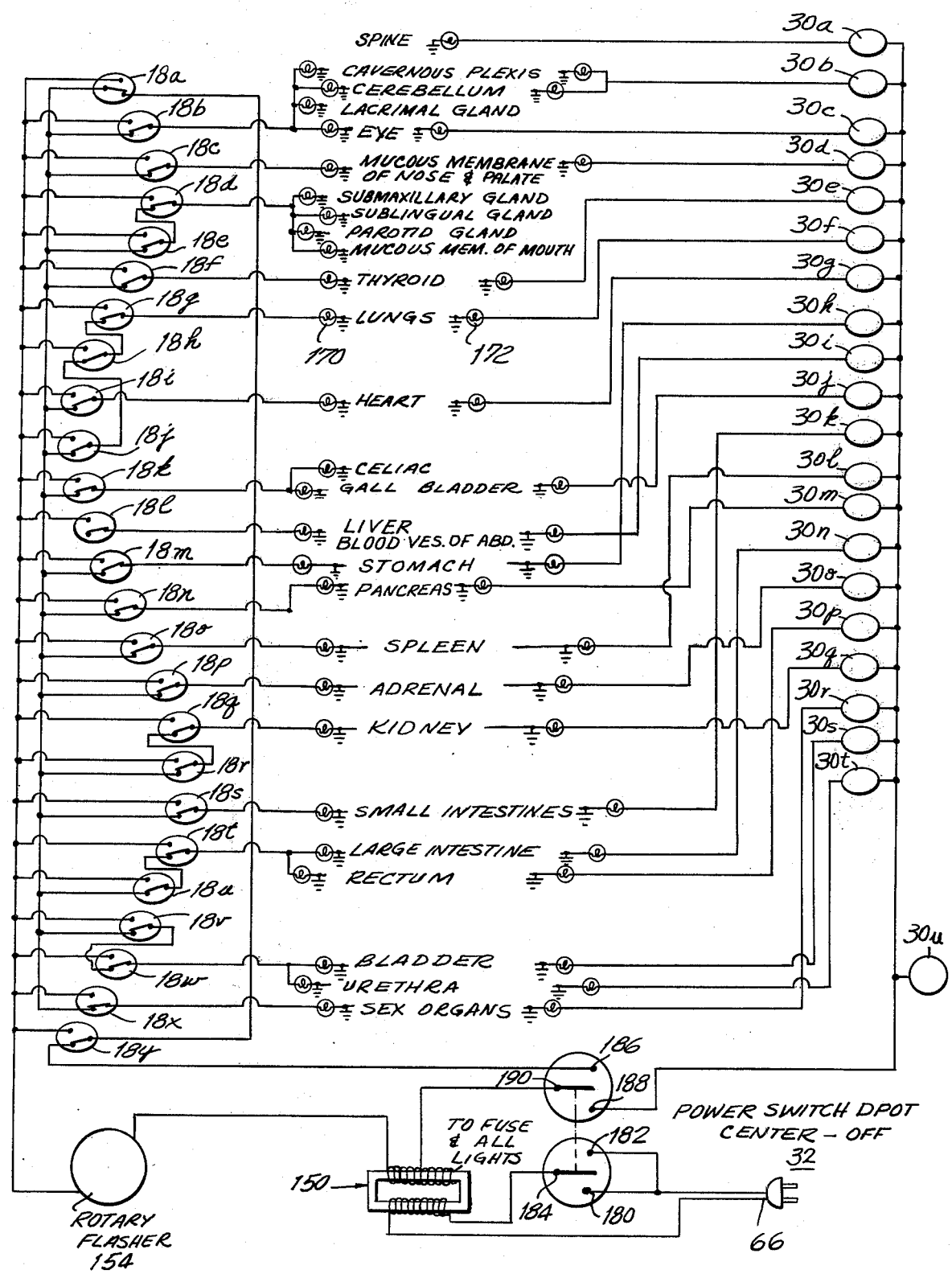
FIG. 7 is a diagram of the electrical circuitry of an illumination control system supplied in accordance with the invention.

Reference is next made to FIG. 7 showing a portion of electrical circuitry referred to generally hereinabove. In FIG. 7 is illustrated the plurality of push button switches 18a–18y. Also is illustrated the plurality of switches 30a–30t. Of the switches 18, switches 18b, 18c, 18d, 18i, 18j, 18k, 18p, 18q, 18r, 18s and 18t are single-pole, double-throw switches. The other switches are double-pole, double-throw and the second poles of these switches are illustrated in FIG. 8 and will be discussed in greater detail hereinafter. Generally, switches 18a–18y are associated with vertebrae as indicated hereinabove and are also associated with lamps or bulbs or other means of illumination indicated generally at 170. As noted hereinabove, the lamps are arranged in two pluralities, one of which will correspond to lamp 170 and the other of which will correspond to the lamp indicated at 172. These two pluralities of lamps are respectively associated with specific organs or the like indicated by the legends in FIG. 7.

Also appearing in FIG. 7 are the power transformer 150, the switch 32 which is a double-pole, double-throw switch with the center position being the off position, and the power supply line 66. Power is delivered to the input contacts 180 and 182 of switch 32 and the power is led via contact 184 to the power transformer 150. On the other hand selectivity is provided by contacts 186 and 188, operating in conjunction with contact 190, whereby power is selectively delivered to the flasher unit 154 to the various switches 18 mentioned hereinabove, or selectively to the switch 18y which, operating in conjunction with switch 18a, provides for a steady state illumination of all of the organs simultaneously in view of the normal operating conditions of the switches 18b–18x.

It will now, however, become apparent that upon a utilization of contact 188 through appropriate manipulation of switch 32, power is supplied via flasher unit 154 to the various switches 18b–18x and delivered upon an operation of these switches to respective selective lamps 170, thereby selectively illuminating respective of the organs as desired. The pulsation of the illumination is intended to represent a dysfunctioning of or a pain in the respectively selected organs or other corresponding parts.

At the same time, power is delivered via contact 188 to the various switches 30a–30t and these switches are connected to the lamps 172. When switch 32 is appropriately manipulated, subsequent operation of switches 30a–30t will selectively illuminate the organs and muscles independently of relationship to the vertebrae in the spinal column as has been discussed hereinabove.

As will be recalled, switches 18a, e, f, g, h, l, m, n, o, u, v, w, and x were mentioned hereinabove as being double-pole, double-throw switches, the second poles of which were illustrated in FIG. 8. FIG. 8 illustrates that these second poles are also coupled through the rotary flasher 184 to the power transformer 150 supplied with power through the intermediary of power line 66. Various of these switches are connected individually or in series via lines 200, 202, and 204 and 206 to connector pins 30v, 30w, 30x and 30y. These pins as well as common 30z in a circuit indicated at 208, are part of the musculature connector system to be discussed in greater detail with reference to FIG. 9 hereinafter. Circuit 208 indicates a fusing system and a connection to the various lights as will become apparent hereinafter.

Figure 9:
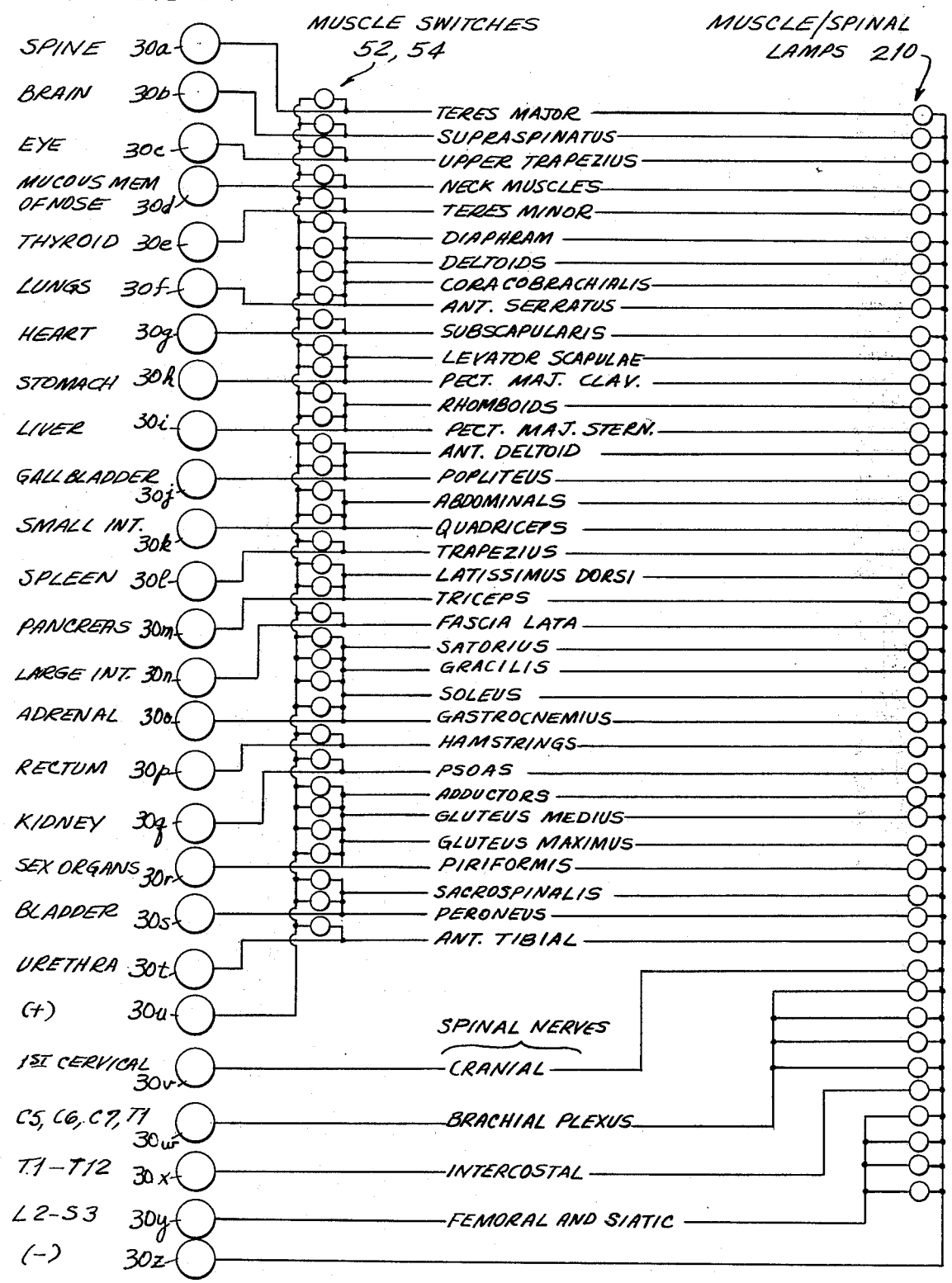
FIG. 9 is a diagram of further control and illumination circuitry employed in accordance with the invention in the visual display apparatus of FIG. 1.

FIG. 9 illustrates the various switches 30 and their connection via respective lines to muscle switches 52, 54 referred to hereinabove with reference to FIG. 1 and the frame 12 therein. In FIG. 9, by the virtue of the legending therein, it will be seen that the muscles switches are associated with respective of the identifiable muscles in the musculature system as well as with the spinal nerves to control the localized selective activation of the muscle and spinal nerve lamps 210 positionally associated with the muscles and spinal nerves.

The specific parts for the above circuitry may be selected according to the following Table 1. However, it will be readily appreciated that a wide variety of suitable substitutes are available.

TABLE I

| | | |
|---|---|---|
| Power Switch - DPDT No. ST-118 | 125 AC | 15 Amps on-off-on |
| Spinal Switch - SPDT No. MS-299 | 125 AC | 3 Amps momentary |
| DPDT No. MS-300 | 125 AC | 3 Amps momentary |
| Muscle Switch - SPST No. PSB-111 | 125 AC | 1 Amp momentary norm. off |
| Bulb - GE 419 8 volt .68 Amp miniature screw | | |
| Sockets - Leecraft No. 5-02-1 | | |
| Transformer - EPCO No. 5367 8 volt-6 volt center tap 10 Amps | | |
| Fuse - Buss AGC 10 | | |
| Fuse holder - Buss No. 3823-1 | | |
| Power cord - Belden No. 17237 | | |
| Connector - Amp. Plug No. 205210-1 Receptacle No. 250209-1 | | |
| Flasher unit - Phillips Motor No. 7650 10 RPM CW 115AC | | |
| Microswitch No. V3L-2104-D8 | | |

Table II below indicates the relationship of switches, organs and muscular lights and switches provided in accordance with the invention to show the relationship between the autonomic nervous system and the musculature-spinal nerve system in accordance with a preferred embodiment of the invention.

TABLE II

| AUTONOMIC NERVOUS SYSTEM | | MUSCULATURE SYSTEM |
|---|---|---|
| Switch | Organ | Muscle light and switch |
| 30 a | Spine | Teres Major |
| 30 b | Brain | Supraspinatus |
| 30 c | Eye | Upper Trapezius |
| 30 d | Mucous Mem. of Nose | Neck Muscles |
| 30 e | Thyroid | Teres Minor |
| 30 f | Lungs | Diaphragm; Deltoids; Coracobrachialis; Ant. Serratus |
| 30 g | Heart | Subscapularis |
| 30 h | Stomach | Levator Scapulae; Pect. Major Clav. |
| 30 i | Liver | Rhomboids; Pect. Major Stern. |
| 30 j | Gall Bladder | Anterior Deltoid; Popliteus |
| 30 k | Small Intestine | Abdominals; Quadriceps |
| 30 l | Spleen | Trapezius |
| 30 m | Pancreas | Latissimus Dorsi; Triceps |
| 30 n | Large Intestine | Fascia Lata |
| 30 o | Adrenal Gland | Satorius; Gracilis; Soleus; Gastrocnemius |
| 30 p | Rectum | Hamstrings |
| 30 q | Kidney | Psoas |
| 30 r | Sex Organs | Adductors; Gluteus Medius & Maximus; Piriformis |
| 30 s | Bladder | Sacrospinalis; Peroneus |
| 30 t | Urethra | Ant. Tibial |

Finally, reference is made to FIG. 10 wherein is shown the relationship between a switch 30 operating in conjunction with a lamp 172 and a switch 52,54 operating in conjunction with a lamp 210. These switches and lamps are coupled through the intermediary of connector 60 as has been mentioned hereinabove. It will be seen that the musculature system is paired with the organs of the autonomic nervous system unit to demonstrate the organ to muscle relationship to constitute the diagnostic therapy procedure known as Applied Kinesiology. The musculature system comprises 35 switches and 35 corresponding muscle legends. The switches are located in the center of each muscle and the lamps illuminate when either their switch is depressed or the switch of their specific organ in the autonomic nervous system is depressed. The circuit illustrated in FIG. 10 shows such a relationship. In the illustrated case, there are two muscles linked to one organ. The connection via line 220 as well as the parallel connection indicated at 222 and the coupling of the switches by line 224 mean that operation of one of switches 52 or 54 will operate lamps 210 and lamp 172. Correspondingly, operation of switch 30 will operate not only lamp 172 corresponding to an organ, but will also operate lamps 210 corresponding to muscles. Therefore, an activating of any one of these three switches will illuminate all three lamps.

From what has been described above, it will now be appreciated that the autonomic nervous system is illustrated in the form of two separate circuits. The switches which are & illustrated as being in association with the various vertebrae will illuminate in a particular manner or cause to be modified the illumination of specific organs which are related to the vertebrae, whereas the switches 30 will cause a specific illumination of selected organs independent of the vertebrae. Switches 30 will also operate to cause illumination of related muscles in the musculature system. Operation of switches 52 or 54 in the musculature system will operate not only to illuminate selected muscles in the musculature system, but will also operate the lamps illuminating specific organs in the autonomic nervous system illustration.

There will now be obvious to those skilled in the art many modifications and variations of the system set forth hereinabove. However, it will be appreciated that the invention relates further to a method, namely, visually displaying a human body or the like inclusive of a spinal column consisting of vertebrae and associated organs and selectively illuminating said organs by switches respectively positioned adjacent the vertebrae and in correspondence thereto.

A feature of the method of the invention comprises further illuminating the organs independently of the switches associated with the vertebrae. This latter illumination is effected through controls positioned in correspondence with the organs.

It will be noted that the organs can be selectively illuminated in steady state or in pulsating mode according to the invention and that a further aspect of the invention relates to further visually displaying a human body inclusive of musculature composed of muscles and selectively illuminating the muscles by controls arranged in positional correspondence therewith.

In accordance with the invention, the method includes intercoupling the controls for the organs with the controls for the muscles and, as a further aspect of the invention, there is incorporated the visual display of spinal nerves and the illumination of the same by associated controls positionally arranged in correspondence therewith which will also illuminate specific organs.

The invention is not limited by the description provided hereinabove which is intended to merely illustrate preferred methods and display devices provided in accordance with the invention. Instead, the invention is intended to be limited merely by the claims which follow hereinafter and the equivalents thereof.

What is claimed is:

1. Display apparatus comprising display means for displaying a human spine including a plurality of vertebrae and for displaying a plurality of human organs physiologically associated with said vertebrae, illumination means for illuminating said organs, control means positionally corresponding to respective of said vertebrae and adapted for being individually operated to modify the illumination of respective of said organs, said control means including switches respectively positioned adjacent said vertebrae and electric circuitry coupling said switches to said illumination means to modify the illumination of the corresponding organs, supplemental control means coupled to said illumination means for illuminating selective of the said organs independently of the vertebrae, said illumination means including a first plurality of lamps coupled via said electric circuitry to said switches and a second plurality of lamps coupled to said supplemental control means, and supplemental display means for displaying musculature inclusive of a plurality of physiologically related muscles, musculature lamps for illuminating respective of said muscles, said muscles being physiologically related to said organs, musculature switches for selectively operating said musculature lamps, and electric circuit means coupling said musculature switches and musculature lamps to said supplemental control means such that operation of the supplemental control means illuminates said organs and muscles selectively and operation of the musculature switches illuminates said organs and operates said musculature lamps selectively.

2. Display apparatus as claimed in claim 1 comprising brackets for supporting pairs of said lamps from said first and said second pluralities adjacent said organs, and clips mounting said lamps detachably on said brackets.

3. Display apparatus as claimed in claim 1 wherein at least one lamp of said second plurality is coupled to at least one musculature switch in addition to being coupled to said supplemental control means.

4. Display apparatus as claimed in claim 3 wherein the musculature lamp associated with the said at least one musculature switch is additionally coupled to and operated by said supplemental control means.

5. Display apparatus as claimed in claim 1 comprising flasher means coupled to and operated by said control means to modify the illumination of said organs by causing said illumination means to pulsate.

6. Display apparatus as claimed in claim 1 wherein said supplemental display means displays spinal nerves and includes further lamps for illuminating the spinal nerves and controls for operating said further lamps.

7. Display apparatus as claimed in claim 1 comprising separate frames respectively supporting the first said display means and said supplemental display means and respectively supporting said supplemental control means and musculature switches.

8. Display apparatus as claimed in claim 7 comprising coupling means connecting said supplemental control means and musculature switches.

9. Display apparatus as claimed in claim 5 wherein said flasher means includes a rotating cam and a switch periodically operated by said cam.

10. Display apparatus as claimed in claim 8 comprising flasher means coupled to and operated by the first said control means to modify the illumination of said organs by causing said illumination means to pulsate.

11. Display apparatus as claimed in claim 7 wherein the frames are of substantially equal size and are generally rectangular in shape, said frames being in edgewise abutting relation.

12. Display apparatus as claimed in claim 1 wherein said display means includes a layer of transparent material having a print of a human body thereon including a print of said spine and organs.

13. Display apparatus as claimed in claim 7 wherein the first said display means includes a layer of transparent material having a print of a human body thereon including a print of said spine and organs and said supplemental display means also includes a layer of transparent material having at least one print of a human body thereon inclusive of said musculature.

14. Display apparatus as claimed in claim 12 comprising a layer of light impermeable material on the layer of transparent material between the latter and said illumination means, said light impermeable material being provided with openings adjacent the organs for the illumination of the same.

15. Display apparatus as claimed in claim 13 comprising layers of light impermeable material on the layers of transparent material between the latter and said illumination means and said musculature lamps respectively, said layers of light impermeable material being provided with openings for the illumination of said organs and muscles.

* * * * *